United States Patent [19]

McClain

[11] 4,329,304
[45] May 11, 1982

[54] PROCESS FOR THE PREPARATION OF FINELY DIVIDED THERMOPLASTIC RESIN

[75] Inventor: Dorothee M. McClain, Cincinnati, Ohio

[73] Assignee: National Distillers & Chemical Corp., New York, N.Y.

[21] Appl. No.: 205,831

[22] Filed: Nov. 10, 1980

[51] Int. Cl.$^3$ .............................................. B01J 2/06
[52] U.S. Cl. .......................................... 264/8; 264/9
[58] Field of Search ....................................... 264/8, 9

[56] References Cited

U.S. PATENT DOCUMENTS

| | | | |
|---|---|---|---|
| 3,586,654 | 6/1971 | Lerman et al. | 264/9 |
| 3,674,736 | 7/1972 | Lerman et al. | 264/9 |
| 4,174,335 | 11/1979 | Ohdaira et al. | 260/29.6 RW |
| 4,200,601 | 4/1980 | McClain | 264/9 |
| 4,252,969 | 2/1981 | Broering et al. | 264/9 |

*Primary Examiner*—James R. Hall
*Attorney, Agent, or Firm*—Kenneth D. Tremain

[57] ABSTRACT

Powders of thermoplastic resins such as polyethylene homopolymer and ethylene-vinyl acetate copolymer are obtained by agitating molten resin in admixture with water and in the presence of a dispersing amount of a substantially water soluble salt of an interpolymer of (i) at least one ethylenically unsaturated ester derived from an alpha, beta-ethylenically unsaturated carboxylic acid and a lower alkanol and (ii) at least one alpha, beta-ethylenically unsaturated carboxylic acid as dispersing agent.

6 Claims, No Drawings

PROCESS FOR THE PREPARATION OF FINELY DIVIDED THERMOPLASTIC RESIN

BACKGROUND OF THE INVENTION

1. Field of the Invention

This invention belongs to the field of processes for providing thermoplastic resins in fine powder form and, more particularly, to such processes in which the powders are obtained from aqueous dispersions of resin.

2. Description of the Prior Art

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additives; mold release agents for rubber; additives to waxes, paints, and polishes; binders for non-woven fabrics; and so on.

It is well known that high molecular weight thermoplastic resins, for example, polyethylene and ethylene copolymers, may be converted to dispersions of spherically shaped particles which are substantially devoid of particles greater than 25 microns in diameter and in which the number average particle diameter is less than about 10 microns. Thus, McClain, U.S. Pat. No. 3,422,049, teaches that such dispersions of finely divided particles may readily be prepared by agitating the molten resin in admixture with water at elevated temperatures and at autogeneous pressure, in the presence of certain dispersing agents which are particular block copolymers of ethylene oxide and propylene oxide. The non-agglomerated spherical particles can be recovered as powders by cooling the dispersions below about 100° C. and collecting the suspended material by filtration or centrifugation.

U.S. Pat. No. 3,418,265 further teaches that the particle size of such thermoplastic resin dispersions can be reduced still further, to the sub-micron level, while retaining the unique spherical particle shape by including in the dispersions process a volatile, inert, water-insoluble organic liquid that is soluble in the thermoplastic resin in an amount between 0.5 to 20 parts per 100 parts of the resin, whereupon a stable, aqueous, film-forming latex is ultimately obtained as the final product. Alternatively, U.S. Pat. No. 3,522,036 teaches that stable, film-forming aqueous latices of high molecular weight polyethylene can also be formed by including a liquid vinyl monomer such as styrene in the dispersion process.

Although the foregoing dispersion procedures are conveniently operated as batch processes, it is also known to produce such finely divided powders in a sequential, continuous dispersion process. See, e.g., U.S. Pat. No. 3,432,483.

U.S. Pat. No. 3,586,654 teaches that it is further possible to conduct the dispersion process in such a way that the polymer particles may be further transformed into spherical particles of controlled average size and size distributions which are the same, larger or smaller than the starting particles. If desired, the dispersion process can be modified in such a manner as to produce spherical foamed particles (U.S. Pat. No. 3,472,801), or to incorporate within the particles certain colorants (U.S. Pat. No. 3,449,291) and pigments (U.S. Pat. No. 3,674,736).

The fine powders are, by virtue of their small particle size, narrow particle size range, and spherical particle shape, unique states of matter which cannot readily be prepared by other conventional processes known in the art. The advantages and utility of such fine powders have been described in many of the aforesaid patent disclosures. In addition, it has been found that various substrates can be coated by applying the above described dispersions of polyolefin fine powders in an inert carrier, heating to evaporate the carrier, and fusing the polyolefin to the substrate (U.S. Pat. No. 3,432,339). Further, U.S. Pat. No. 3,669,922 teaches a process for preparing colored polymer powders having controlled charge and printing characteristics of value as toners in electrostatic printing.

The product brochure, "Carboset Resins", GC-47 Revised (B. F. Goodrich Co.), which describes interpolymers of acrylic esters and acrylic acids discloses that the aforesaid interpolymers can function as polymeric soaps or surfactants to wet and coat pigment particles and speed dispersion of pigment aggregates. The brochure neither refers to, or is concerned with, aqueous dispersion systems for the preparation of fine thermoplastic resin powders.

SUMMARY OF THE INVENTION

In accordance with this invention a normally solid thermoplastic resin is rapdily dispersed under conditions of rapid mixing in water heated to a temperature at or above the melting point of the resin, employing as dispersing agent at least one substantially water soluble salt of an interpolymer of (i) at least one ethylenically unsaturated ester derived from an alpha, beta-ethylenically unsaturated carboxylic acid and a lower alkanol and (ii) at least one alpha, beta-ethylenically unsaturated carboxylic acid, and following cooling of the aqueous dispersion to a temperature which is below about 100° C., the resin is recovered therefrom as a finely divided powder. The use of the substantially water soluble salts of the foregoing interpolymers as dispersing agents herein generally provides resin particles which are larger than those obtained by the use of the block copolymers of ethylene oxide and propylene oxide heretofore employed as dispersing agents and affords wider ranges of resin particle size than those attainable with the latter dispersants without, however, requiring the use of large amounts of dispersant. In addition, the dispersing agents herein substantially avoid the, at times, objectionable ultrafine (about 10 microns or less) resin particle fractions which can be produced by the aforementioned block copolymers of ethylene oxide and propylene oxide.

The cooled dispersion of resin powder obtained by the process of this invention can be directly employed in various applications or the resin powder can be recovered from the dispersion media using known and conventional procedures such as filtration and centrifugation. Any residual dispersing agent associated with the resin powder can be readily removed therefrom following one or more washings with water.

DESCRIPTION OF THE PREFERRED EMBODIMENTS

In general, the polymers suitable for the practice of this invention include any normally solid synthetic organic polymeric thermoplastic resin whose decomposition point is somewhat higher than its melting point and somewhat less than the critical temperature of water. Included are polyolefins, vinyls, olefin-vinyl copolymers, olefin-allyl copolymers, polyamides, acrylics, polystyrenes, cellulosics, polyesters and fluorocarbons.

The polyolefins most suitable for the practice of this invention include normally solid polymers of olefins, particularly mono-alpha olefins, which comprise from two to about six carbon atoms, e.g., polyethylene, polypropylene, polybutene, polyisobutylene, poly (4-methylpentene), and the like. Preferred polyolefin feeds are polyethylene and polypropylene.

Vinyl polymers suitable for use in this invention include polyvinyl chloride, polyvinyl fluoride, vinyl chloride/vinyl acetate copolymers, and polyvinylidene chloride and fluoride.

Suitable olefin-vinyl copolymers include ethylene-vinyl acetate, ethylene-vinyl propionate, ethylene-vinyl isobutyrate, ethylene-vinyl alcohol, ethylenemethyl acrylate, and ethylene-ethyl methacrylate. Especially preferred are ethylene-vinyl acetate copolymers wherein the ethylene constitutes at least about 25%, preferably at least about 50%, of the copolymer by weight.

Olefin-allyl copolymers include ethylene-allyl alcohol, ethylene-allyl acetate, ethylene-allyl ether, ethylene-acrolein, and the like. Ethylene-allyl alcohol is especially preferred.

Preferred among the polyamides are linear superpolyamide resins, commonly referred to as nylons. Such polymers can be made by the intermolecular condensation of linear diamines containing from 6 to 10 carbon atoms with linear dicarboxylic acids containing from 2 to 10 carbon atoms. Equally well, the superpolyamides may be made from amide-forming derivatives of these monomers such as esters, acid chlorides, amine salts, etc. Also suitable are superpolyamides made by the intramolecular polymerization of omega-amino-acids containing 4 to 12 carbon atoms and of their amide-forming derivatives, particularly the internal lactams. Examples of specific nylons are polyhexamethylene adipamide, polyhexamethylene sebacamide and polycaprolactam. Especially preferred are nylons having intrinsic viscosities ranging between 0.3 to 3.5 dl./g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

The dispersing agents of this invention are in themselves well known and are obtained by first copolymerizing (a) at least one ethylenically unsaturated ester derived from an alpha, beta-ethylenically unsaturated carboxylic acid and a lower alkanol and (b) at least one alpha, beta-ethylenically unsaturated carboxylic acid, and thereafter neutralizing the resulting interpolymer which contains free carboxylic acid groups with a salt-forming base to render the interpolymer substantially water soluble. The dispersing agents herein are ionic in nature, possess average molecular weight is from about 10,000 to about 1,000.000 or higher, and preferably from about 40,000 to about 300,000, and are for the most part random in the ordering of the monomer constituents.

Among the alpha, beta-ethylenically unsaturated carboxylic acids which can be reacted with a lower alkanol to provide the ethylenically unsaturated ester monomer component of the interpolymers herein are included acrylic acid, methacrylic acid, ethacrylic acid, itaconic acid, maleic acid, fumaric acid, monoesters of dicarboxylic acids such as methyl hydrogen maleate, methyl hydrogen fumarate and ethyl hydrogen fumarate and the chemically equivalent acid anhydrides such as maleic anhydride. The lower alkanols which can be reacted with the foregoing acids include the monoalkanols of from 1 to about 20 carbon atoms such as methanol, ethanol, propanol, isopropanol, n-butanol, sec-butanol, t-butanol, pentanol, hexanol, 2-ethylhexanol, heptanol, octanol, nonanol, decanol, and the like. Some specific ethylenically unsaturated esters which can be interpolymerized with ethylenically unsaturated acid include methyl acrylate, ethyl acrylate, butyl acrylate, 2-ethyhexyl acrylate, decyl methyacrylate, stearyl acrylate, isopropylacrylate and cyclohexylmethacrylate. Methyl acrylate and methyl methacrylate are especially preferred.

The alpha, beta-ethylenically unsaturated carboxylic acid monomers which are copolymerized with the ethylenically unsaturated esters to provide the interpolymers herein can be selected from among any of the foregoing carboxylic acids. Acrylic acid and methyl acrylic acid are especially preferred. The Carbosets (B. F. Goodrich Co.) represent one suitable series of commercially available interpolymers of unsaturated ester and unsaturated acid which in the salt form can be used as dispersing agents in the process of this invention. Of this series, Carboset 525, an interpolymer having an average molecular weight of about 260,000 and an acid number in the range of from about 75 to about 85 when neutralized with salt-forming base to provide water solubility has been found to provide particularly good results herein.

Copolymerization of the foregoing monomers can be carried out in accordance with any of the techniques heretofore known or employed. The relative amounts of ethylenically unsaturated ester and ethylenically unsaturated carboxylic acid which are copolymerized to provide the interpolymers herein can vary over wide limits provided the interpolymer will possess sufficient carboxylic acid groups that subsequent neutralization of a part or all of these groups will provide a water soluble resin. This capability generally corresponds to an interpolymer having an acid number between about 60 and about 90, and preferably an acid number between about 75 and about 85.

The neutralization of the carboxylic acid groups-containing interpolymer can be carried out prior to the utilization of the interpolymers in the dispersion process of this invention or the interpolymer can be added to the aqueous dispersion medium prior to, simultaneously with, or subsequent to, the addition to said medium of a sufficient quantity of salt-forming base to accomplish neutralization in situ. The neutralization need be carried out only to the extent of making the interpolymers water soluble but if desired, can be carried out substantially to completeness. Among the salt forming bases which can be used for accomplishing the neutralization are ammonia and the water-soluble amine bases such as pyridine, the alkali metal hydroxides, oxides and carbonates, the alkaline earth metal hydroxides, oxides and carbonates, and basic salts obtained from the reaction of strong bases with weak acids. Of the foregoing, the alkali metal hydroxides are especially preferred.

The interpolymer dispersing agents of the present invention, by functioning effectively from temperatures as low as the melting point of low density polyethylene, i.e., about 115° C. up to as high as 325° C., are not limited to the dispersion of low molecular weight low density polyethylenes. For example, high molecular weight low density polyethylenes, linear polyethylene, polypropylene, polyvinyl chloride, ethylene-vinyl acetate copolymers, ethyleneallyl alcohol copolymers, nylon, and the like, can be readily dispersed by means of the subject novel dispersing agents to dispersions substantially devoid of particles larger than 500 microns and wherein the particles have a relatively narrow size range. Where larger average particle sizes are desired or acceptable, however, dispersion temperatures may be employed, still in combination with only relatively mild agitation, at which the resin exhibits a melt flow rate appreciably lower than 15, for example as low as about 2.

The temperature of operation is dependent upon the melting point, melt flow properties, decomposition temperature, and desired fineness of dispersion of the selected synthetic organic thermoplastic resin and ionomer polymer dispersing agent. While the foregoing can be dispersed at temperatures commencing with their respective melting point, increases in dispersion temperature beyond the melting point and up to the decomposition of the resins are generally accompanied by corresponding increases in the fluidity of the molten resin. As the fluidity of the melt increases, the dispersions generally tend to develop lower average particle sizes without requiring increases in agitation effort.

The dispersing apparatus or device may be any device capable of delivering at least a moderate amount of shearing action under elevated temperatures and pressures to a liquid mixture. Suitable, for example, are conventional autoclaves equipped with conventional propeller stirrers. Propellers designed to impart greater shear to the mixture tend to improve the recovered yield of pulverulent polymer, but with little effect on the particle size and distribution of recovered polymer. The particle size and distribution are somewhat dependent on the stirring rate, high stirring speeds resulting in finer and narrower dispersions until an optimum speed is reached above which there is little change. In general, the rate of stirring can vary from about 1200 to about 4,000 rpm and preferably from about 1800 to about 3800 rpm. Stirring rates lower than these can be sufficient for a particular dispersion medium and higher rates, while operable, are usually without advantage. The overall recovery yield of pulverulent polyolefin from the dispersion is dependent upon the duration of stirring. For a given type and rate of stirring, a period of stirring exists within which maximum recoverable yields of pulverulent polyolefins result. Either shorter or longer periods of stirring result in lower recoverable yields. Preferred stirring periods generally will range from about 1 to 60 minutes, and preferably from about 5 to 15 minutes. It will be understood, however, that the stirring rates and periods will depend upon the type of equipment utilized. While the rate and duration of agitation affect particle size and distribution and recoverable yields of pulverulent polymer, these variables can be readily optimized for any given polyolefin through simple, routine experimentation.

In carrying out the subject process, the selected synthetic organic thermoplastic polymer is first contacted with water and the dispersing agent. It is a particularly advantageous feature of this invention that the dispersing agent need not be incorporated into the polymer prior to the introduction of the water by such mean as milling and the like, but may be introduced into the dispersing apparatus simultaneously with the other ingredients or as a dispersion in the aqueous phase. It is, of course, within the scope of this invention to prepare a polymer blend or alloy of the thermoplastic polymer and dispersing agent employing known techniques, e.g., milling, hot-melt blending, etc., and introducing the blend or alloy into the dispersing apparatus along with the other ingredients of the dispersion medium. If desired, the dispersion process may be operated in a continuous manner, in which case it is convenient to premix the desired ratio of ionomer polymer dispersing agent, water, and thermoplastic resin, and introduce this mixture continuously to the reactor while continuously removing from another part of the reactor the product dispersion.

The amount of water used in relation to the resin dispersed generally ranges from about 0.1 to about 10.0 parts by weight of water per part of normally solid resin. Higher ratios are operable but uneconomical whereas lower ratios, although usable, present operational difficulties. The preferred range is between about 0.2 to about 5.0 parts per part of resin.

The amount of interpolymer dispersing agent should be sufficient to provide a dispersion of the resin in the water under the selected conditions. Very good dispersions can be obtained at amounts within the range of from 2 to about 25 weight parts dispersing agent per 100 weight parts of resin and as such, these amounts being preferred. There is no upper limit on the amount of dispersing agent which can be employed except that exceeding the amount beyond that required to provide an acceptable dispersion may be economically wasteful.

The temperature for forming the hot aqueous resin dispersion can range from about 100° C. to about 270° C. with temperature of from about 150° C. to about 250° C. being preferred.

The pressure under which the present process is carried out is so adjusted to exceed the vapor pressure of water at the operating temperature so as to maintain a liquid water phase. More particularly, the pressures may range from about 1 to 217 atmospheres, and preferably from about 6 to 120 atmospheres. In cases where the resin is sensitive to air at the elevated dispersion temperature, an inert gas, e.g., nitrogen or helium, may be substituted.

In the case of resin dispersions which are not latices, the temperature of the dispersion may be lowered to below about 100° C., and the resin separated from the aqueous phase in the form of discrete particles by filtration, evaporation of the water, and the like.

Drying of the recovered finely-divided resins yields a free-flowing powder of fine particle size and narrow particle size distribution. Generally, all of the dispersed particles have diameters less than about 500 microns. By varying the composition of the subject novel dispersing agents and the ratio of thermoplastic resin to water, average particle size ranging from about 300 microns to as low as about 10 microns or below can be obtained.

The finely-divided resins of this invention are superior in powder form for static or fluidized dip coating, spraying, dusting, and flame spraying applications as well as for preparing stable dispersions in water or some other medium for use in roller, dip, or spray coating. The relatively high molecular weight resins of this invention also find use in the preparation of heat resistant coatings, in the preparation of molded or formed shapes of powder or slush molding techniques, and in the preparation of foams in combination with conventional blowing agents.

Latices can be prepared within the framework of this invention through the use of a combination of selected thermoplastic resins and particular dispersing conditions. Included among the resins suitable for dispersion to latices are low density polyethylenes having a melt flow rate above about 3000, and particularly between about 4000 and 10,000. Also included are copolymers of ethylene and vinyl acetate wherein the ethylene constitutes at least 25 percent, and preferably at least 50 percent by weight of the final copolymer, and wherein the copolymers exhibit at 190° C. melt flow rates of at least 15, and preferably between about 25 and 7,000. Dispersion temperatures suitable for producing the above latices are generally above about 160° C., and preferably range from about 175° to 225° C.

The resultant latices by definition deposit continuous films when the aqueous medium is permitted to evaporate under uniform and mild conditions, such as in air at ambient temperature and atmospheric pressure. This property imparts important and useful value to the latices which can be used for applying continuous film coatings at ambient temperature to substrates such as paper, paperboard, metal foil, glass, plastic film or sheet, and the like, and for waterproofing fibers and textiles.

Examples 1–4 are illustrative of this invention. By contrast, Example 5 which is illustrative of a process employing acrylic acid polymers (in the salt form) as dispersing agents demonstrates the lack of effectiveness of these resins to provide dispersions of thermoplastics.

EXAMPLE 1

150 parts of PETROTHENE 202 (U.S. Industrial Chemicals Company), a polyethylene having a density of 0.915 g/cc and a melt index (ASTM D-1238, Condition E) of 22.0 g/10 min, in the form of pellets, 15 parts of Carboset 525, 0.85 g sodium hydroxide (for substantially complete neutralization of the Carboset 525), and 450 ml deionized water were charged to a reactor. Heat was applied until the temperature of the mixture reached 200° C. at a pressure of 235 psi and then shut off. Stirring was then started immediately after the temperature had reached 200° C. and lasted about 15 minutes until the temperature had dropped below 100° C. The residual pressure was then bled off and the obtained dispersion was suction-filtered on a Buchner funnel fitted with a No. 541 Whitman filter paper. The residue was washed thoroughly with water and dried for 4 hours at 60° C. Since the sodium salt of Carboset 525 is water soluble, it can be assumed that it is substantially removed from the dispersed polymer. The dried polyethylene residue comprised 150 parts of a fine white powder having a melt index of 22.0 g/10 min. at 190° C. A sieve analysis gave the following particle size distribution; 9.0 weight percent passing 52 microns, 51.8 weight percent passing 106 microns, 71.0 weight percent passing 149 microns, 84.8 weight percent passing 250 microns and 95.1 weight percent passing 420 microns.

The same operating conditions of the above procedure were employed using the same polyethylene and the same type and amount of surfactant but varying the sodium hydroxide. The Carboset in run A was 59% neutralized and in run B, 100%. In runs C-F, excess amounts of sodium hydroxide were used. In all cases fine dispersions resulted whose particle sizes are given in Table I as follows:

TABLE I

Influence of Base Concentration on Particle Size Distribution in Polyethylene Dispersions

| | | Sieve Analysis of Particles in Weight Percent | | | | |
|---|---|---|---|---|---|---|
| Run | NaOH g | <53 Microns | 53–105 Microns | 106–149 Microns | 149–250 Microns | 250–420 Microns | >420 Microns |
| A | 0.5 | 1.9 | 12.6 | 14.1 | 23.2 | 42.6 | 5.5 |
| B | 0.85 | 9.0 | 42.8 | 19.2 | 13.8 | 10.3 | 4.9 |
| C | 1.0 | 10.6 | 55.6 | 17.2 | 13.7 | 2.8 | T |
| D | 2.0 | 30.4 | 35.5 | 21.0 | 10.9 | 2.2 | — |
| E | 3.0 | 3.4 | 29.5 | 28.0 | 18.0 | 18.4 | 2.7 |
| F | 4.0 | T | T | 7.5 | 19.7 | 23.4 | 49.4 |

EXAMPLE 2

A series of three dispersions was carried out as described in Example 1 in which the concentration of Carboset 525 was varied from 4.2 parts to 10 parts per 100 parts polyethylene. The charges consisted of 300 g PETROTHENE 202, 300 ml deionized water, 2 g sodium hydroxide, and the Carboset 525. In all runs, the polymer dispersed and a fine white powder was obtained. The particle sizes of the resulting dispersions are given in Table II as follows:

TABLE II

Influence of Carboset 525 Concentration on Particle Size Distribution in Polyethylene Dispersions

| Run | Carboset 525 g | <53 Microns | 53–105 Microns | 106–149 Microns | 149–250 Microns | 250–420 Microns | >420 Microns |
|---|---|---|---|---|---|---|---|
| A | 30 | 62.1 | 28.0 | 3.3 | 6.2 | 0.4 | T |
| B | 15 | 47.1 | 31.0 | 11.8 | 8.1 | 2.0 | T |
| C | 12.5 | 34.0 | 29.8 | 14.2 | 8.9 | 10.3 | 2.8 |

EXAMPLE 3

150 parts of a linear polyethylene having a density of 0.962 g/cc and a melt index (ASTM D-1238, Condition E) of 28.0 g/10 min. in the form of pellets were dispersed according to the technique described in Example 1 employing 15 parts of Carboset 525 together with 450 ml water and 2 g sodium hydroxide. 100% of the polyethylene was dispersed in the form of microscopic spheres, which following sieving of the dried resin, had the following particle size distribution: 51.2% passed 52$\mu$, 82.7% passed 106$\mu$, 93.7% passed 140$\mu$ and 100% passed 250$\mu$.

EXAMPLE 4

150 parts of VYNATHENE EY 901 (U.S. Industrial Chemicals Company) an ethylene vinyl acetate copolymer having a melt flow rate. (ASTM D-1238, Condition E) of 3.9 g/10 min and containing 37.22% vinyl acetate was dispersed by a procedure similar to that of Example 1. The charge contained 150 g of the copolymer, 450 ml deionized water, 15 g Carboset 525 and 2 g sodium hydroxide. A very fine dispersion of 100% yield and of spherical copolymer particles resulted.

EXAMPLE 5

A series of dispersions employing the procedure of Example 1 were attempted using the polymeric surfactants Dispex N-40, (Allied Colloids, Inc.), the sodium salt of a polymeric carboxylic acid, and Dispex G-40 (Allied Colloids, Inc.), the sodium salt of an acrylic copolymer, and the sodium salt of a polyacrylic acid of 4,000,000 molecular weight from Polysciences, Inc. Each charge contained 150 g VYNATHENE EY 901, 450 ml deionized water and 15 g of surfactants. No dispersion resulted in any case, the polymer being recovered in a solid mass wrapped around the stirrer. Additional amounts of sodium hydroxide in each charged failed to produce any discernible improvement.

What is claimed is:

1. A process for preparing in finely divided form a solid organic polymeric thermoplastic resin which comprises:
   (a) agitating a mixture of the resin while in the molten stage, a dispersion-forming amount of water, and a dispersion forming amount of a substantially water soluble salt of an interpolymer of (i) at least one ethylenically unsaturated ester derived from an alpha-beta-ethylenically unsaturated carboxylic acid and a lower alkanol and (ii) at least one alpha, beta-ethylenically unsaturated carboxylic acid as dispersing agent to provide a hot aqueous dispersion of the resin;
   (b) cooling the dispersion to provide solid particles of resin; and,
   (c) recovering said solid particles of resin from the aqueous dispersion to provide said solid polymeric thermoplastic resin in finely divided form.

2. The process of claim 1 wherein the resin is a polyolefin.

3. The process of claim 1 wherein the resin is polyethylene or polypropylene homopolymer or copolymer.

4. The process of claim 1 wherein the resin is ethylene-vinyl acetate copolymer.

5. The process of claim 1 wherein the interpolymer is prepared from (i) methyl acrylate and/or methyl methacrylate and (ii) acrylic acid and/or methyl acrylic acid.

6. The process of claim 5 wherein the interpolymer is partially or substantially completely neutralized with an alkali metal hydroxide, oxide or carbonate to provide the dispersing agent.

* * * * *